(12) United States Patent
Zhao

(10) Patent No.: US 9,967,756 B2
(45) Date of Patent: May 8, 2018

(54) CELL MANAGEMENT METHOD AND BASE STATION

(71) Applicant: HUAWEI TECHNOLOGIES CO., LTD., Shenzhen (CN)

(72) Inventor: Dong Zhao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/083,996

(22) Filed: Mar. 29, 2016

(65) Prior Publication Data
US 2016/0212637 A1 Jul. 21, 2016

Related U.S. Application Data

(63) Continuation of application No. PCT/CN2013/084706, filed on Sep. 30, 2013.

(51) Int. Cl.
H04W 40/00 (2009.01)
H04W 24/02 (2009.01)
H04W 48/16 (2009.01)
H04W 84/04 (2009.01)

(52) U.S. Cl.
CPC .......... *H04W 24/02* (2013.01); *H04W 48/16* (2013.01); *H04W 84/042* (2013.01)

(58) Field of Classification Search
CPC .... H04W 24/02; H04W 48/16; H04W 84/042
See application file for complete search history.

(56) References Cited

U.S. PATENT DOCUMENTS

2008/0207207 A1 8/2008 Moe et al.
2010/0048217 A1 2/2010 Deshpande et al.
(Continued)

FOREIGN PATENT DOCUMENTS

CN 101627643 A 1/2010
CN 102197682 A 9/2011
(Continued)

OTHER PUBLICATIONS

"3rd Generation Partnership Project; Technical Specification Group Services and System Aspects; Telecommunication management; Configuration Management (CM); UTRAN network resources Integration Reference Point (IRP); Network Resource Model (NRM) (Release 11)", 3GPP TS 32.642 V11.4.1, Valbonne, France, Sep. 2013, 50 pages.

(Continued)

*Primary Examiner* — Wayne H Cai
(74) *Attorney, Agent, or Firm* — Staas & Halsey LLP

(57) ABSTRACT

The present invention discloses a cell management method and a base station. The method includes: obtaining, by a base station, configuration information, where the configuration information includes information about at least two cells, the first cell and the second cell belong to different public land mobile networks PLMNs or are managed by different network element management systems; and managing, by the base station, the at least two cells according to the configuration information. According to the present invention, it can implement collaborative management of cells that are in different PLMNs or different network element management systems under a shared base station.

15 Claims, 3 Drawing Sheets

(56) References Cited

U.S. PATENT DOCUMENTS

| | | | |
|---|---|---|---|
| 2010/0105380 A1* | 4/2010 | Attar | H04W 48/16 455/434 |
| 2010/0142110 A1 | 6/2010 | Casper et al. | |
| 2013/0044639 A1 | 2/2013 | Wang et al. | |
| 2014/0038647 A1* | 2/2014 | Zhang | H04W 68/02 455/458 |
| 2014/0073304 A1* | 3/2014 | Brisebois | H04W 24/02 455/418 |
| 2014/0148165 A1* | 5/2014 | Serravalle | H04W 16/14 455/436 |

FOREIGN PATENT DOCUMENTS

| | | |
|---|---|---|
| CN | 102244935 A | 11/2011 |
| CN | 102378273 A | 3/2012 |
| WO | 2008/030956 A2 | 3/2008 |

OTHER PUBLICATIONS

"3rd Generation Partnership Project; Technical Specification Group Services and System Aspects; Telecommunication management; Configuration Management (CM); GERAN network resources Integration Reference Point (IRP); Network Resource Model (NRM)(Release 11)", 3GPP TS 32.652 V11.2.1, Valbonne, France, Sep. 2013, 21 pages.

"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS)(Release 11)", 3GPP TS 32.762 V11.5.0, Valbonne, France, Mar. 2013, 59 pages.

International Search Report dated Jan. 30, 2014 in corresponding International Patent Application No. PCT/CN2013/084706.

International Search Report dated Jan. 30, 2014, in corresponding International Application No. PCT/CN2013/084706.

Chinese Office Action dated Dec. 6, 2017 in corresponding Chinese Patent Application No. 201380002281.8.

* cited by examiner

CELL MANAGEMENT METHOD AND BASE STATION

CROSS REFERENCE

This application is a continuation of International Application No. PCT/CN2013/084706, filed on Sep. 30, 2013, which is hereby incorporated in its entirety by reference.

TECHNICAL FIELD

Embodiments of the present invention relate to the field of communications technologies, and in particular, to a cell management method and a base station.

BACKGROUND

With the increasing advancement of communications network technologies, multiple operators, multiple public land mobile networks (Public Land Mobile Network, PLMNs), and multiple network element management systems emerge, and it is inevitable that cells of different kinds emerge in a same area or under a same application scenario. Different operators, PLMNs, or network element management systems are independent from each other and do not interfere with each other in managing cells, and are different in specific management.

In a same geographic area or under a same application scenario, multiple operators co-exist and provide various services for different users or a same user at the same time. To save a cost, a shared network or network element, such as a shared base station, emerges. However, in the prior art, all cells of a shared base station are cells belonging to a same PLMN or cells managed by a same network element management system because of information isolation, so that it still cannot be implemented that cells under different PLMNs or cells under different network element management systems are set up on a same base station. Otherwise, consequences, such as mutual interference between cells, result from that the cells are managed by different system management, so that utilization of a base station cannot be further improved to reduce a cost of communications.

Therefore, on a same base station, how to implement collaborative management of cells under different PLMNs or cells in different network element management systems is a to-be-solved problem in the prior art.

SUMMARY

Embodiments of the present invention provide a cell management method and a base station, so as to implement collaborative management of cells that are in different PLMNs or network element management systems under a shared base station.

To solve the foregoing technical problems, the embodiments of the present invention disclose the following technical solutions:

According to a first aspect, a cell management method is provided and includes:
  obtaining, by a base station, configuration information, where the configuration information includes information about at least two cells;
  the information about the cell of the at least two cells includes a number of the cell; the number of the cell includes a number of a public land mobile network PLMN in which the cell is located or a number of a network element management system that manages the cell;
  the cells include a first cell and a second cell, and
  the first cell and the second cell belong to different public land mobile networks PLMNs or are managed by different network element management systems; and
  managing, by the base station, the at least two cells according to the configuration information.

In a first possible implementation of the first aspect, when the number of the cell includes the number of the PLMN in which the cell is located, the number of the cell further includes a serial number of the cell under the PLMN;
  or
  when the number of the cell includes the number of the network element management system that manages the cell, the number of the cell further includes a serial number of the cell in the network element management system that manages the cell.

In a second possible implementation of the first aspect, the first cell and the second cell are cells isolated from each other in physical space.

In a third possible implementation of the first aspect, the first cell and the second cell are neighboring cells in physical space; and
  the managing, by the base station, the at least two cells according to the configuration information includes:
  maintaining, by the base station, a neighboring relation table of the first cell and a neighboring relation table of the second cell, where the neighboring relation table of the first cell includes a number of the second cell, and the neighboring relation table of the second cell includes a number of the first cell.

In a fourth possible implementation of the first aspect, the obtaining, by a base station, configuration information includes:
  receiving, by the base station, the configuration information input by a user;
  or
  receiving, by the base station, a configuration instruction sent by a network management device, and obtaining the configuration information from the configuration instruction.

According to a second aspect, a base station is provided and includes:
  a memory, configured to store configuration information, where the configuration information includes information about at least two cells;
  the information about the cell of the at least two cells includes a number of the cell; the number of the cell includes a number of a public land mobile network PLMN in which the cell is located or a number of a network element management system that manages the cell;
  the cells include a first cell and a second cell, and
  the first cell and the second cell belong to different public land mobile networks PLMNs or are managed by different network element management systems; and
  a processor, configured to manage the at least two cells according to the configuration information stored in the memory.

In a first possible implementation of the second aspect, besides the number of the PLMN in which the cell is located, the number of the cell further includes a serial number of the cell under the PLMN;

or besides the number of the network element management system that manages the cell, the number of the cell further includes a serial number of the cell in the network element management system that manages the cell.

In a second possible implementation of the second aspect, the first cell and the second cell are cells isolated from each other in physical space.

In a third possible implementation of the second aspect, the first cell and the second cell are neighboring cells in physical space; and the processor is configured to maintain a neighboring relation table of the first cell and a neighboring relation table of the second cell, where the neighboring relation table of the first cell includes a number of the second cell, and the neighboring relation table of the second cell includes a neighboring relation of the second cell.

In a fourth possible implementation of the second aspect, the base station further includes:

a human-machine interaction interface, configured to receive configuration information input by a user, and send the configuration information to the memory;

or a configuration interface, configured to receive a configuration instruction sent by a network management device, and send configuration information in the configuration instruction to the memory.

In the embodiments of the present invention, according to the cell management method and the base station, a base station is enabled to acquire configuration information, and cells belonging to different PLMNs or cells managed by different network element management systems are assigned, by using the configuration information, to a same base station for configuration and collaborative management, so as to break through information isolation between different PLMNs or different network element management systems. Objectives, such as sharing a hardware network element and reducing repeated coverage, are achieved by performing the collaborative management on cells in different PLMNs or cells in different network element management systems, so that a hardware cost and an operating cost are low, and a desirable communication quality can be ensured.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
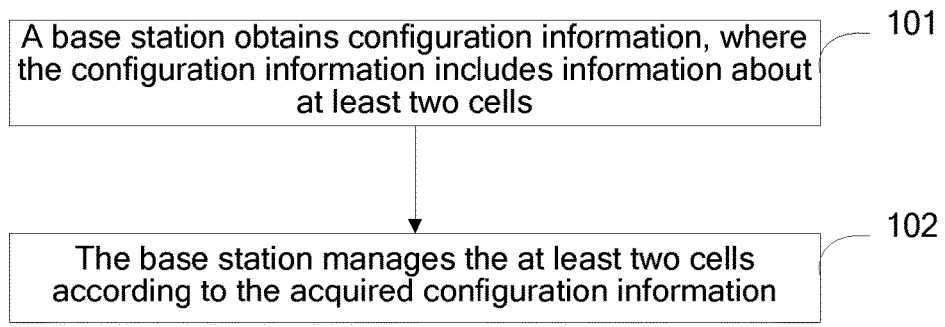
FIG. 1 is a schematic flowchart of a cell management method according to Embodiment 1 of the present invention.

Embodiment 1 provides a cell management method. Referring to FIG. 1, the method includes:

Step 101: A base station obtains configuration information, where the configuration information includes information about at least two cells.

The information about the cell includes a number of the cell; and the number of the cell includes a number of a PLMN in which the cell is located or a number of a network element management system that manages the cell.

The cells include a first cell and a second cell.

The first cell and the second cell belong to different public land mobile networks PLMNs or are managed by different network element management systems.

Step 102: The base station manages the at least two cells according to the acquired configuration information.

In this embodiment of the present invention, a base station is enabled to acquire configuration information, and by using the configuration information, cells belonging to different PLMNs or cells managed by different network element management systems are configured in a same base station and managed collaboratively, so as to break through information isolation between different PLMNs or different network element management systems. Objectives of sharing a hardware network element and reducing repeated coverage are achieved by performing the collaborative management on cells in different PLMNs or cells in different network element management systems, so that a hardware cost and an operating cost are low.

In the foregoing step 101, to identify the first cell and the second cell more accurately, when the number of the cell includes the number of the PLMN in which the cell is located, the number of the cell may further include a serial number of the cell under the PLMN; and when the number of the cell includes the number of the network element management system that manages the cell, the number of the cell may further include a serial number of the cell in the network element management system that manages the cell.

The cell management method shown in FIG. 1 may at least be applicable to the following two service scenarios:

Service scenario 1: A service scenario in which the first cell and the second cell are cells isolated from each other in physical space.

Service scenario 2: The first cell and the second cell are neighboring cells in physical space.

For the service scenario 2, a specific implementation of the foregoing step 102 may include that: the base station maintains a neighboring relation table of the first cell and a neighboring relation table of the second cell, where the neighboring relation table of the first cell includes a number of the second cell, and the neighboring relation table of the second cell includes a number of the first cell.

In the foregoing step 101, the base station may obtain the configuration information in multiple manners. For example, the base station receives the configuration information input by a user; or the base station receives a configuration instruction sent by a network management device and obtains the configuration information from the configuration instruction.

Embodiment 2

Figure 2:
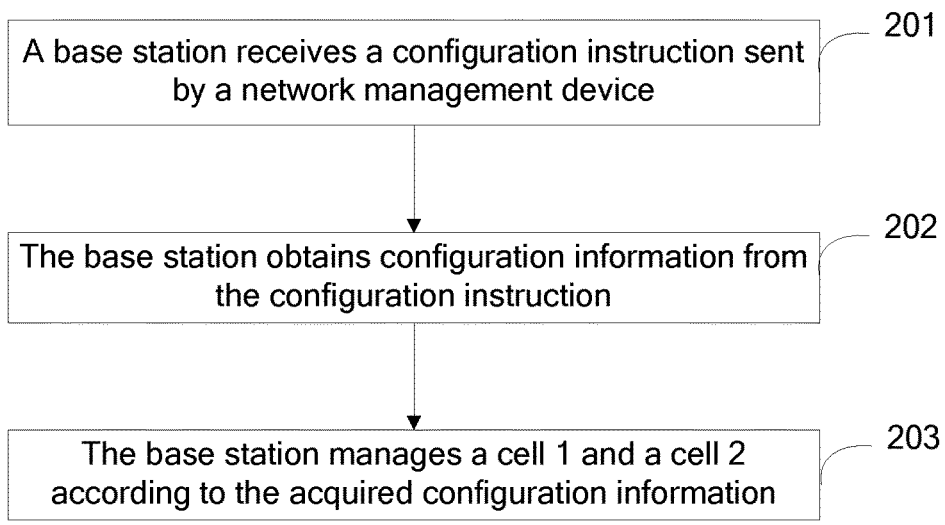
FIG. 2 is a schematic flowchart of a cell management method according to Embodiment 2 of the present invention.

A service scenario to which Embodiment 2 is applicable is the foregoing service scenario 1. For example, a same base station manages two cells that are marked as cell 1 and cell 2, where the cell 1 and the cell 2 belong to different PLMNs or are managed by different network element management systems, and the cell 1 and the cell 2 are cells isolated from each other in physical space. Referring to FIG. 2, a cell management method in this embodiment includes:

Step 201: A base station receives a configuration instruction sent by a network management device.

Step 202: The base station obtains configuration information from the configuration instruction.

The base station may also acquire the configuration information in another manner; for example, in a manner that a user performs configuration on the base station directly. In this case, the implementing process from step 201 to step 202 may be replaced by that: the base station receives configuration information input by a user, so as to obtain the configuration information.

In this step, the configuration information acquired by the base station includes information about the cell 1 and information about the cell 2.

The information about the cell 1 includes a number of the cell; and the number of the cell includes: a number of a PLMN in which the cell 1 is located and a serial number of the cell 1 under the PLMN; or the number of the cell includes: a number of a network element management system that manages the cell 1 and a serial number of the cell 1 in the network element management system that manages the cell 1.

The information about the cell 2 includes a number of the cell; and the number of the cell includes: a number of a PLMN in which the cell 2 is located and a serial number of the cell 2 under the PLMN; or the number of the cell includes: a number of a network element management system that manages the cell 2 and a serial number of the cell 2 in the network element management system that manages the cell 2.

Step 203: The base station manages a cell 1 and a cell 2 according to the acquired configuration information.

In this step, cell management includes various management; for example, management of a coverage area of a cell, management of downlink transmit power of a cell, handover management of a user in a cell, and management of used frequency of a cell.

Embodiment 3

Figure 3:
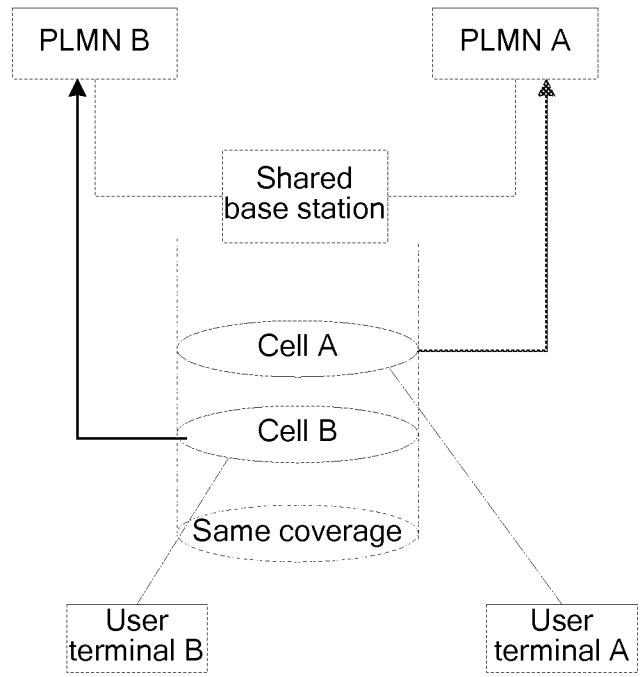
FIG. 3 is a schematic diagram of a scenario in which dual-band cells share a base station.
Figure 4:
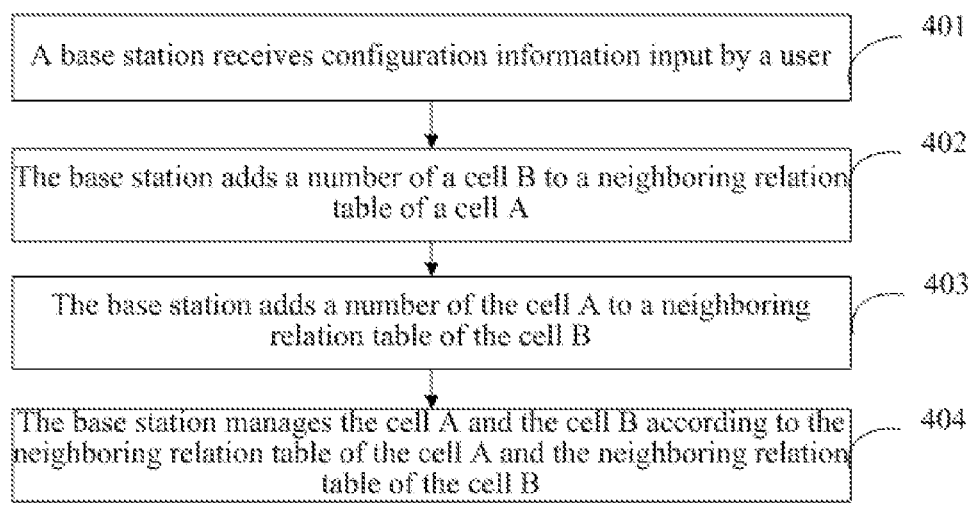
FIG. 4 is a schematic flowchart of a cell management method according to Embodiment 3 of the present invention.

A service scenario to which Embodiment 3 is applicable is the foregoing service scenario 2. For example, a same base station manages two cells that are marked as cell A and cell B, where the cell A and the cell B are managed by different PLMNs, and the cell A and the cell B are neighboring cells in physical space, that is, a coverage area of the cell A and a coverage area of the cell B partly overlap, or the cell A and the cell B share part of coverage boundaries. For example, an application scenario diagram according to Embodiment 2 is shown in FIG. 3. Referring to FIG. 3 and FIG. 4, a cell management method in this embodiment includes:

Step 401: A base station receives configuration information input by a user.

In this step, the base station obtains the configuration information according to the received input of a user.

The base station may also acquire the configuration information in another manner; for example, the base station receives a configuration instruction sent by a network management device and obtains the configuration information from the configuration instruction.

In this step, the configuration information acquired by the base station includes information about the cell A and information about the cell B.

The information about the cell A includes a number of the cell; and the number of the cell includes: a number of a PLMN in which the cell A is located and a serial number of the cell A under the PLMN; or the number of the cell includes: a number of a network element management system that manages the cell A and a serial number of the cell A in the network element management system that manages the cell A.

The information about the cell B includes a number of the cell; and the number of the cell includes: a number of a PLMN in which the cell B is located and a serial number of the cell B under the PLMN; or the number of the cell includes: a number of a network element management system that manages the cell B and a number of the cell B in the network element management system that manages the cell B.

Step 402: The base station adds a number of a cell B to a neighboring relation table of a cell A.

Step 403: The base station adds a number of the cell A to a neighboring relation table of the cell B.

Step 404: The base station manages the cell A and the cell B according to the neighboring relation table of the cell A and the neighboring relation table of the cell B.

In this embodiment, because the number of the cell B is added to the neighboring relation table of the cell A, the cell B is set as a neighboring cell of the cell A, and because the number of the cell A is added to the neighboring relation table of the cell B, the cell A is set as a neighboring cell of the cell B. When neighboring cell management is performed on the cell A or the cell B, joint management, for example, management of interference coordination between the cell A and the cell B, handover management of a mobile communications user between the cell A and the cell B, management of coverage areas of the cell A and the cell B, and management of coordination of energy saving of the cell A and the cell B, is performed according to the information about the cell B and the information about the cell A, so that cells managed by different network element management systems or cells belonging to different PLMNs are managed on a same base station.

Embodiment 4

Figure 5:
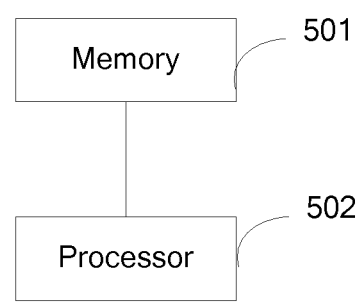
FIG. 5 is a schematic diagram of a base station according to Embodiment 4 of the present invention.

This embodiment provides a base station. Referring to FIG. 5, the base station includes:
 a memory 501, configured to store configuration information, where the configuration information includes information about at least two cells;
 the information about the cell includes a number of the cell; the number of the cell includes a number of a public land mobile network PLMN in which the cell is located or a number of a network element management system that manages the cell;

the cells include a first cell and a second cell, and the first cell and the second cell belong to different public land mobile networks PLMNs or are managed by different network element management systems; and a processor 502, configured to manage the at least two cells according to the configuration information stored in the memory 501.

To identify the first cell and the second cell more accurately, in this embodiment, a better implementation manner is that, besides the number of the PLMN in which the cell is located, the number of the cell stored in the memory 501 further includes a serial number of the cell under the PLMN; or besides the number of the network element management system that manages the cell, the number of the cell stored in the memory 501 further includes a serial number of the cell in the network element management system that manages the cell.

In this embodiment, the first cell and the second cell may be cells isolated from each other in physical space.

In this embodiment, the first cell and the second cell may also be neighboring cells in physical space; and accordingly, the processor 502 is configured to maintain a neighboring relation table of the first cell and a neighboring relation table of the second cell, where the neighboring relation table of the first cell includes a number of the second cell, and the neighboring relation table of the second cell includes a number of the first cell.

In an optional implementation manner of this embodiment, the base station further includes: a human-machine interaction interface, configured to receive configuration information input by a user, and send the configuration information to the memory.

In another optional implementation manner of this embodiment, the base station further includes: a configuration interface, configured to receive a configuration instruction sent by a network management device, and send configuration information in the configuration instruction to the memory.

A person of ordinary skill in the art should understand that each aspect of the present invention or each possible implementation manner of each aspect may be specifically implemented as a system, a method, or a computer program product. Therefore, each aspect of the present invention or each possible implementation manner of each aspect may use a form of hardware only embodiments, software only embodiments, (including firmware, resident software, and so on), or embodiments with a combination of software and hardware, which are uniformly referred to as "circuit", "unit", or "system" herein. Furthermore, each aspect of the present invention or each possible implementation manner of each aspect may use forms of computer program products. Computer program products refer to computer readable program codes stored in a computer readable medium.

A computer readable medium may be a computer readable signal medium or a computer readable storage medium. The computer readable storage medium includes but is not limited to electronic, magnetic, optical, electromagnetic, infrared, or semiconductor systems, devices, or apparatuses, or any appropriate combination of the foregoing items, such as a random access memory (RAM), read-only memory (ROM), erasable programmable read-only memory (EPROM or Flash memory), optical fiber, and portable read-only memory (CD-ROM).

Processing units in computers read computer readable program codes stored in a computer readable medium, so that the processing units can execute functions and actions specified in one step or multiple steps in the flowcharts, and an apparatus is generated to implement functions and actions specified in one block or multiple blocks in the block diagrams.

Computer readable program codes can be completely executed on user computers, partially executed on user computers, used as separate software packages, partially on user computers and partially on remote computers, or completely executed on remote computers or cross-boundary alarm servers. It should also be noted that in certain alternative implementation solutions, functions denoted in each step of the flowcharts or in each block of the block diagrams may not occur according to the sequence denoted in the diagrams. For example, depending on the involved functions, two steps or two blocks successively marked may be performed concurrently, or these blocks sometimes may be performed in a reverse order.

It is apparent that a person skilled in the art can make various modifications and variations to the present invention without departing from the spirit and scope of the present invention. The present invention is intended to cover these modifications and variations provided that they fall within the scope of protection defined by the following claims or their equivalent technologies.

INDUSTRIAL APPLICABILITY

The present invention discloses a cell management method, and a base station, and relates to the field of communications. In the cell management method and apparatus, and the base station according to embodiments of the present invention, cells of different PLMNs or of different network element management systems are set as mutually neighboring cells, and managed according to neighboring relation tables, so as to successfully set up cells of multiple PLMNs or network element management systems on a same base station, thereby achieving advantages that implementation is quick and convenient, costs of hardware and operation are low, and compatibility with the prior art is high. The cell management method and apparatus, and the base station realize that multiple PLMNs or multiple network element management systems share a base station, and have industrial applicability.

What is claimed is:

1. A cell management method, comprising:

obtaining, by a base station, a number of a first cell and a number of a second cell, the base station being a shared base station of the first cell and the second cell;

managing, by the base station, the first cell and the second cell according to the number of the first cell and the number of the second cell and according to a first location of the first cell and a second location of the second cell which is different from the first location of the first cell, wherein:

(1) the number of the first cell comprises a number of a public land mobile network (PLMN) where the first cell is located and the number of the second cell comprises a number of a PLMN where the second cell is located, the PLMN where the first cell is located being different from the PLMN where the second cell is located; or (2) the number of the first cell comprises a number of a network element management system that manages the first cell and the number of the second cell comprises a number of a network element management system that manages the second cell, the network element management system that manages the first cell being different from the network element management system that manages the second cell, wherein the number of the first cell further comprises a serial number of the first cell in the PLMN where the first cell is located, and the number of the second cell further comprises a serial number of the second cell in the PLMN where the second cell is located.

2. The method according to claim 1, wherein the number of the first cell further comprises a serial number of the first cell in the network element management system that manages the first cell, and the number of the second cell further comprises a serial number of the second cell in the network element management system that manages the second cell.

3. The method according to claim 1, wherein the first location of the first cell and the second location of the second cell are cells isolated from each other in physical space.

4. The method according to claim 3, wherein the managing according to the first location and the second location which are isolated from each other in physical space comprises one or a combination of:
managing coverage areas of the first cell and the second cell,
managing downlink transmit power of the first cell and the second cell,
managing handover from the first cell or the second cell, and
managing frequency use of the first cell and the second cell.

5. The method according to claim 1, wherein the first cell and the second cell are neighboring cells in physical space; and
the managing, by the base station, the first cell and the second cell according to the number of the first cell and the number of the second cell, comprises:
maintaining, by the base station, a neighboring relation table of the first cell and a neighboring relation table of the second cell, wherein the neighboring relation table of the first cell comprises the number of the second cell, and the neighboring relation table of the second cell comprises the number of the first cell.

6. The method according to claim 5, wherein the managing according to the first location and the second location which are neighboring in physical space comprises one or a combination of:
managing interference coordination between the first cell and the second cell,
managing handover between the first cell and the second cell, and
managing coordination of energy saving of the first cell and the second cell.

7. The method according to claim 1, wherein the obtaining, by a base station, the number of the first cell and the number of the second cell, comprises:
receiving, by the base station, the number of the first cell and the number of the second cell from a network management device.

8. A base station, comprising:
a memory, configured to store a number of a first cell and a number of a second cell; and
one or more processors, configured to manage the first cell and the second cell according to the number of the first cell and the number of the second cell and according to a first location of the first cell and a second location of the second cell which is different from the first location of the first cell, the base station being a shared base station of the first cell and the second cell, wherein:
(1) the number of the first cell comprises a number of a public land mobile network (PLMN) where the first cell is located and the number of the second cell comprises a number of a PLMN where the second cell is located, the PLMN where the first cell is located being different from the PLMN where the second cell is located; or
(2) the number of the first cell comprises a number of a network element management system that manages the first cell and the number of the second cell comprises a number of a network element management system that manages the second cell, the network element management system that manages the first cell being different from the network element management system that manages the second cell,
wherein the number of the first cell further comprises a serial number of the first cell in the PLMN where the first cell is located, and the number of the second cell further comprises a serial number of the second cell in the PLMN where the second cell is located.

9. The base station according to claim 8, wherein the number of the first cell further comprises a serial number of the first cell in the network element management system that manages the first cell, and the number of the second cell further comprises a serial number of the second cell in the network element management system that manages the second cell.

10. The base station according to claim 8, wherein the first cell and the second cell are cells isolated from each other in physical space.

11. The base station according to claim 10, wherein the one or more processors are further configured to manage the first cell and the second cell according to the first location and the second location which are isolated from each other in physical space by one or a combination of:
managing coverage areas of the first cell and the second cell,
managing downlink transmit power of the first cell and the second cell,
managing handover from the first cell or the second cell, and
managing frequency use of the first cell and the second cell.

12. The base station according to claim 8, wherein the first cell and the second cell are neighboring cells in physical space; and
the one or more processors are further configured to manage the first cell and the second cell according to the number of the first cell and the number of the second cell, comprising:
the one or more processors are further configured to maintain a neighboring relation table of the first cell and a neighboring relation table of the second cell, wherein the neighboring relation table of the first cell comprises the number of the second cell, and the neighboring relation table of the second cell comprises the number of the first cell.

13. The base station according to claim 12, wherein the one or more processors are further configured to manage the first cell and the second cell according to the first location and the second location which are neighboring in physical space comprises one or a combination of:
managing interference coordination between the first cell and the second cell,
managing handover between the first cell and the second cell, and managing coordination of energy saving of the first cell and the second cell.

14. The base station according to claim 8, further comprising:
a receiver, configured to receive the number of the first cell and the number of the second cell from a network management device.

15. A base station, comprising:
a memory, and
a processor coupled to the memory, the base station configured to:
manage a first cell associated with a first public land mobile network (PLMN) according to a number of the first cell and according to a first location of the first cell;
manage a second cell associated with a second PLMN according to a number of the second cell and a second location of the second cell which is different from the first location of the first cell, the base station managing the first cell being a same base station as the base station managing the second cell, wherein:
(1) the number of the first cell comprises a number of the first PLMN where the first cell is located and the number of the second cell comprises a number of the second PLMN where the second cell is located, the first PLMN where the first cell is located being different from the second PLMN where the second cell is located; or
(2) the number of the first cell comprises a number of a first network element management system that manages the first cell and the number of the second cell comprises a number of a second network element management system that manages the second cell, the first network element management system that manages the first cell being different from the second network element management system that manages the second cell,
wherein the number of the first cell further comprises a serial number of the first cell in the PLMN where the first cell is located, and the number of the second cell further comprises a serial number of the second cell in the PLMN where the second cell is located.

* * * * *